United States Patent Office 2,893,997
Patented July 7, 1959

2,893,997
SYNTHESIS OF INDOLYLMETHYL-HYDANTOIN

James N. Coker and Melvin Fields, Wilmington, Del., and Arthur O. Rogers, Lewiston, N.Y., assignors to E. I. du Pont de Nemours and Company, Wilmington, Del., a corporation of Delaware No Drawing. Application February 21, 1958
Serial No. 716,550

3 Claims. (Cl. 260—309.5)

This invention relates to the preparation of hydantoins and is more particularly concerned with a new route to 5-(3-indolylmethyl)-hydantoin.

In our application Serial No. 684,416, filed September 17, 1957, it is disclosed that 3-indoleacetaldehyde hydrazones such as 3-indoleacetaldehyde semicarbazone or 3-indoleacetaldehyde phenylhydrazone, or their 1-acetyl derivatives, are converted to 5-(3-indolylmethyl)-hydantoin by reaction with ammonium ions, carbonate ions and cyanide ions in solution, and that this hydantoin is readily hydrolyzed to tryptophan. Tryptophan is a known amino acid of considerable commercial value. The hydrazone starting materials can be prepared from 3-indoleacetaldehyde or from 3-indoleacetonitrile. The hydrazone has a 3-indolylmethyl group attached to a carbon which is doubly bonded to a single nitrogen atom of the hydrazone group of the compound. It has now been found that the desired conversion to this hydantoin takes place when the 3-indolylmethyl group is attached to carbon in an imidazolidine ring having suitable N-substituents, thus making possible the preparation of tryptophan from a different class of intermediates.

It is an object of this invention to provide a new route to 5-(3-indolylmethyl)-hydantoin. Other objects will become apparent from the specification and claims.

In accordance with this invention it has been found that 1,3-diphenyl-2-(3'-indolylmethyl)-imidazolidine, or the 1'-acetyl derivative, is converted to 5-(3-indolylmethyl)-hydantoin by the following reaction:

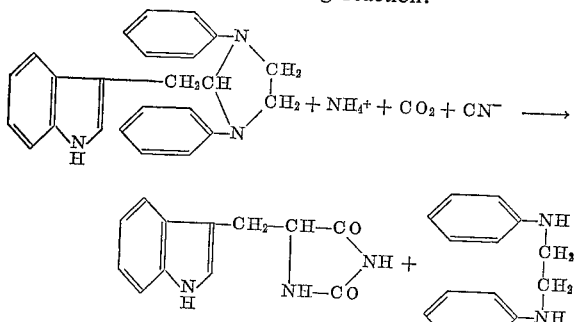

In the process of this invention the 1,3-diphenyl-2-(3'-indolylmethyl)-imidazolidine or 1,3-diphenyl-2-(1'-acetyl-3'-indolylmethyl)-imidazolidine is heated in an inert polar solvent, preferably water or a lower alcohol or a mixture thereof, containing ammonium ions, carbonate ions and cyanide ions. Ammonium carbonate and hydrogen cyanide are the most convenient sources of the required ions, but other materials can obviously be used to form these ions in solution. Thus carbon dioxide and ammonia or various ammonium salts can be added separately, in place of ammonium carbonate, and metal cyanides can be used in place of hydrogen cyanide. Solid carbon dioxide can be added to increase the concentration of carbon dioxide in solution. The addition of a small amount of sodium hydrogen sulfite or other bisulfite will usually increase the yield, but is not essential. The yield may also be improved by complete exclusion of oxygen from the reaction. A reaction temperature of about 40° C. to about 220° C. is suitable, with pressure being required at the higher temperatures. The optimum reaction temperature is 100° to 150° C. At about 100 C. the reaction is usually complete in about 3 to 4 hours. The relatively insoluble hydantoin product can be recovered by concentrating the reaction mixture, dissolving the salts in a solvent and filtering off the product. The yield can frequently be improved by concentrating the filtrate or salting out soluble product with neutral salts, e.g., sodium sulfate. The hydantoin is purified by recrystallization from water or other solvent.

The 1,3-diphenyl-2-(3'-indolylmethyl)-imidazolidine and 1,3-diphenyl-2-(1'-acetyl-3'-indolylmethyl)-imidazolidine used as starting materials in the process of this invention may be prepared as described by H. Plieninger and G. Werst, Chem. Ber., 88, 1956 (1955) and 89, 2783 (1956).

In the following examples, which illustrate preferred embodiments of the invention, parts are by weight:

Example 1

A mixture of 21.23 parts of 1,3-diphenyl-2-(3'-indolylmethyl)-imidazolidine, 37.7 parts of ammonium carbonate, 6.5 parts of liquid hydrogen cyanide, and 12.5 parts of sodium bisulfite in a mixture of about 300 parts of water and 200 parts of methanol was heated in a pressure vessel lined with Hastelloy B at 100° C. for 3.5 hours. The product mixture was then evaporated to dryness in vacuo, leaving a yellow solid (40.6 parts). This solid was washed with two portions (100–150 parts) of cold water to remove salts, leaving 23.1 parts of undissolved material. This water-insoluble solid was then extracted with hot benzene (150 parts) to remove regenerated N,N'-diphenylethylenediamine. The benzene-insoluble material (10.3 parts, 75% yield, of 5-(3-indolylmethyl)hydantoin) melted at 213–219° C. The product was purified by recrystallization from methanol and then from water to give ivory white needles melting at 220–223 C.; this material gave the same X-ray diffraction pattern as authentic 5(3-indolylmethyl)-hydantoin.

*Analysis.*—Found: C, 62.73, 62.95; H, 4.91, 4.87; N, 18.49, 1857. Calculated for $C_{12}H_{11}N_3O_2$: C, 62.88; H, 4.83; N, 18.33.

Example 2

1,3 - diphenyl - 2-(1'-acetyl-3'-indolylmethyl)-imidazolidine (30 parts), ammonium carbonate (60 parts), hydrogen cyanide (approximately 20 parts), sodium bisulfite (1 part), methanol (300 parts) and water (300 parts) were charged into a Hastelloy B tube and heated at 100° for 4 hours with shaking. The reaction mixture was then cooled to 0–5°, discharged and taken to dryness in a Rinco evaporator under aspirator vacuum. The residue after extraction with three 5-part portions of dry ether was obtained as a light yellow solid in a yield of 4 parts. It was obtained as pale yellow needles, M.P. 215–218°, from methanol. This recrystallized product did not depress appreciably the melting point (218–219°) of an authentic sample of 5-(3-indolylmethyl)-hydantoin.

Since many different embodiments of the invention may be made without departing from the spirit and scope thereof, it is to be understood that the invention is not limited by the specific illustrations except to the extent defined in the following claims.

We claim:

1. The process for producing 5-(3-indolylmethyl)-hydantoin which comprises reacting a compound selected from the group consisting of 1,3-diphenyl-2-(3'-indolyl-methyl)-imidazolidine and 1,3-diphenyl-2-(1'-acetyl-3'-indolylmethyl)-imidazolidine, with ammonium ions, carbonate ions and cyanide ions in an inert polar liquid solvent at 40° to 220° C.

2. The process for producing 5-(3-indolylmethyl)-hydantoin which comprises heating a mixture of 1,3-diphenyl-2-(3-indolylmethyl)-imadazolidine and a solution containing ammonium ions, carbonate ions and cyanide ions in an inert polar liquid solvent at 40° to 220° C., and recovering the 5-(3-indolylmethyl)-hydantoin formed from the reaction mixture.

3. The process for producing 5-(3-indolylmethyl)-hydantoin which comprises heating a mixture of 1,3-diphenyl-2-(1'-acetyl-3'-indolylmethyl)-imidazolidine and a solution containing ammonium ions, carbonate ions and cyanide ions in an inert polar liquid solvent at 40° to 220° C., and recovering the 5-(3-indolylmethyl)-hydantoin formed from the reaction mixture.

References Cited in the file of this patent

FOREIGN PATENTS 687,486     Great Britain _____ Feb. 18, 1953